United States Patent
Saga

(10) Patent No.: US 7,989,538 B2
(45) Date of Patent: Aug. 2, 2011

(54) FLAME RESISTANT SEMIAROMATIC POLYAMIDE RESIN COMPOSITIONS AND PROCESSES FOR THE PREPARATION OF THE COMPOSITIONS EXHIBITING INCREASED MELT FLOW AND ARTICLES THEREFROM

(75) Inventor: Yuji Saga, Utsunomiya (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/582,945

(22) Filed: Oct. 21, 2009

(65) Prior Publication Data

US 2010/0113656 A1　　May 6, 2010

Related U.S. Application Data

(60) Provisional application No. 61/197,779, filed on Oct. 30, 2008.

(51) Int. Cl.
*C08K 3/34*　　(2006.01)
*C08K 5/5313*　　(2006.01)
*C08K 5/12*　　(2006.01)

(52) U.S. Cl. ......... 524/451; 524/126; 524/133; 524/296

(58) Field of Classification Search .................. 524/126, 524/133, 296, 451

See application file for complete search history.

(56) References Cited

U.S. PATENT DOCUMENTS

| | | | |
|---|---|---|---|
| 3,419,517 A | 12/1968 | Hendrick | |
| 3,899,462 A | 8/1975 | Newbould | |
| 5,773,556 A | 6/1998 | Kleiner | |
| 6,255,371 B1 | 7/2001 | Schlosser | |
| 2005/0119379 A1* | 6/2005 | Martens et al. | 524/115 |
| 2006/0030693 A1 | 2/2006 | Martens | |
| 2009/0081462 A1* | 3/2009 | Miyoshi et al. | 428/407 |
| 2009/0275682 A1* | 11/2009 | Furukawa et al. | 524/126 |

FOREIGN PATENT DOCUMENTS

| | | |
|---|---|---|
| WO | 96/09344 | 3/1996 |
| WO | 2005/033192 | 4/2005 |

* cited by examiner

*Primary Examiner* — Peter Szekely

(57) ABSTRACT

There is provided high temperature flame retarded polyamides which provide superior properties in molded articles while maintaining high flow in the molding process. The resin compositions include, in addition to the polyamide and flame retardant, talc and at least one inorganic reinforcing agent and/or filler other than talc. Processes for their preparation and articles made from these compositions are also disclosed.

10 Claims, No Drawings

FLAME RESISTANT SEMIAROMATIC POLYAMIDE RESIN COMPOSITIONS AND PROCESSES FOR THE PREPARATION OF THE COMPOSITIONS EXHIBITING INCREASED MELT FLOW AND ARTICLES THEREFROM

CROSS REFERENCE TO RELATED APPLICATIONS

This application claims the benefit of U.S. Provisional Application No. 61/197,779, filed Oct. 30, 2008, which is incorporated herein by reference in its entirety.

FIELD OF THE INVENTION

The present invention relates to non-halogenated flame retardant thermoplastic semiaromatic polyamide compositions.

More particularly, the invention relates to such flame retardant thermoplastic semiaromatic polyamide composition which comprises selected phosphinates as flame retardant and inorganic reinforcing agent but which exhibit increased melt flow, and are useful in Surface Mount Technology (SMT) applications, and a process for the preparation of the polyamide compositions.

BACKGROUND OF THE INVENTION

Polyamide resins possess excellent mechanical properties, moldability, and chemical resistance and have therefore been used in automotive parts, electric/electronic components, mechanical components, and many other applications. Articles made from polyamide resins can possess extremely desirable physical properties. However, in certain applications, it is desirable that polyamide resin compositions be flame retardant and meet the UL-94 standard for a high degree of flame retardance. This need has promoted research into a variety of methods for imparting flame retardance to polyamide resins. A common method of imparting flame retardance to thermoplastic resin compositions involves incorporating a halogenated organic compound such as brominated polystyrene as a flame retardant along with an antimony compound that acts as a synergist for the flame retardant. However, the use of halogenated flame retardants has certain drawbacks in that these materials tend to decompose or degrade at the temperatures used to mold polyamide compositions. The degradation products can corrode the barrels of compounding extruders, the surfaces of molding machines, and other melt processing equipment halogenated flame retardants come in contact with at elevated temperatures. This problem can be particularly pronounced in the case of semiaromatic polyamide compositions, as these materials often have melting points that are significantly higher than those of many aliphatic polyamides. The degradation products of halogenated flame retardants can also result in molded articles that have poor surface appearance.

It would thus be desirable to obtain a non-halogenated flame retardant semiaromatic polyamide composition that leads to reduced levels of corrosion of melt processing equipment while satisfying certain regulatory requirements.

The use of non-halogenated flame retardants such as phosphate or phosphinate compounds with triazine derivatives has been disclosed in WO 96/09344. U.S. Pat. No. 5,773,556 disclose compositions comprising polyamide and phosphinate or diphosphinate. U.S. Pat. No. 6,255,371 discloses compositions comprising polymers such as polyamide or polyester, with a flame retardant comprising phosphinate or diphosphinate and melamine derivatives such as condensation products of melamine.

More recently the down sizing trend of electrical & electronics devises requires a high melt flow increasingly for the use of flame retardant polyamide composition in the SMT applications. The use of the phosphinates can eliminate use of halogen containing material from the composition, however, it can decrease melt flow of the composition when the phosphinates dispersed in the polyamide matrix are not fully molten at a molding process.

U.S. patent application publication 2006/0030693 discloses the use of terephthalic acid as an agent to increase melt flow of a high temperature polyamide composition. However, it has been discovered that the use of terephthalic acid disclosed in this publication can lead to void formations during the SMT process.

There is a need for a high temperature flame retarded semiaromatic polyamide which does not cause, at relatively higher temperatures, the formation of voids and the deformation of plastic parts molded therefrom, while maintaining high melt flow (or low melt viscosity, as these terms are used interchangeably) in the molding process.

SUMMARY OF THE INVENTION

The present invention, which allows the stated objective to be attained, concerns a flame retardant polyamide resin composition, comprising:
(a) about 30 to about 90 weight percent of a polyamide component comprising about 20 to 100 weight percent of at least one semiaromatic polyamide, that has an inherent viscosity of lower than 0.85 dl/g;
(b) at least one flame retardant comprising one or more of a phosphinate of the formula (I); a disphosphinate of the formula (II); and polymers of (I) and/or (II)

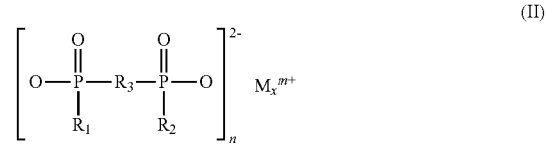

wherein $R_1$ and $R_2$ are identical or different and are $C_1$-$C_6$ alkyl, linear or branched, and/or aryl; $R_3$ is $C_1$-$C_{10}$-alkylene, linear or branched, $C_6$-$C_{10}$-arylene, -alkylarylene or -arylalkylene; M is calcium ions, magnesium ions, aluminum ions and/or zinc ions; m is 2 to 3; n is 1 or 3; and x is 1 or 2;
(c) about 1 to about 15 weight percent of talc
(d) about 20 to about 60 weight percent of at least one inorganic reinforcing agent and/or filler other than talc,
wherein the weight percentages of (a) and (d) are based on the total weight of the composition; wherein flame retardant (b) is present in an amount of about 10 to about 45 percent of the weight of polyamide (a); and wherein the weight percentages of (c) is based on the total weight of the polyamide (a).

The present invention is also directed to a process for the preparation of the flame retardant polyamide resin composition, comprising melt-blending a polyamide component (a), flame retardant (b), talc (c) and inorganic reinforcing agent and/or filler other than talc (d) with 0.1 to 10 weight percent, based on the total weight of the polyamide (a), of at least one aromatic organic acid, in order to reduce an inherent viscosity of the polyamide component (a') below 0.85 dl/g.

In accordance with another aspect of the invention, articles made from the composition or by the process of the invention are provided.

DETAILED DESCRIPTION OF THE INVENTION

Semi-Aromatic Polyamide

The semi-aromatic polyamides used in the present invention are thermoplastic and may be one or more homopolymers, copolymers, terpolymers, or higher polymers that are derived from monomers containing aromatic groups. Examples of monomers containing aromatic groups are terephthalic acid and its derivatives, isophthalic acid and its derivatives, p-xylylenediamine and m-xylylenediamine. It is preferred that about 5 to about 75 mole percent of the monomers used to make the aromatic polyamide used in the present invention contain aromatic groups, and more preferred that about 10 to about 55 mole percent of these monomers contain aromatic groups.

The semiaromatic polyamide may be derived from one or more of adipic acid, sebacic acid, azelaic acid, dodecanedoic acid, terephthalic acid, isophthalic acid, their derivatives and other aliphatic and aromatic dicarboxylic acids and aliphatic $C_6$-$C_{20}$ alkylenediamines, aromatic diamines, and/or alicyclic diamines. Preferred diamines include hexamethylenediamine; 2-methylpentamethylenediamine; 2-methyloctamethylenediamine; trimethylhexamethylenediamine; 1,8-diaminooctane; 1,9-diaminononane; 1,10-diaminodecane; 1,12-diaminododecane; and m-xylylenediamine. It may also be derived from one or more lactams or amino acids such as 11-aminododecanoic acid, caprolactam, and laurolactam.

Examples of preferred semi-aromatic polyamides include poly(m-xylylene adipamide) (polyamide MXD,6), poly(dodecamethylene terephthalamide) (polyamide 12,T), poly(decamethylene terephthalamide) (polyamide 10,T), poly(nonamethylene terephthalamide) (polyamide 9,T), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T), hexamethylene adipamide/hexamethylene terephthalamide/hexamethylene isophthalamide copolyamide (polyamide 6,6/6,T/6,I), poly(caprolactam-hexamethylene terephthalamide) (polyamide 6/6,T), hexamethylene terephthalamide/hexamethylene isophthalamide (6,T16,I) copolymer, polyamide 10,T/10,12, polyamide 10T/10,10 and the like.

The polyamide component (a) may further comprise one or more aliphatic and/or alicyclic polyamides. The aliphatic and/or alicyclic polyamides may be derived from aliphatic and/or alicyclic monomers such as one or more of adipic acid, sebacic acid, azelaic acid, dodecanedoic acid, or their derivatives and the like, aliphatic $C_6$-$C_{20}$ alkylenediamines, alicyclic diamines, lactams, and amino acids. Preferred diamines include bis(p-aminocyclohexyl)methane; hexamethylenediamine; 2-methylpentamethylenediamine; 2-methyloctamethylenediamine; trimethylhexamethylenediamine; 1,8-diaminooctane; 1,9-diaminononane; 1,10-diaminodecane; 1,12-diaminododecane; and m-xylylenediamine. Preferred lactams or amino acids include 11-aminododecanoic acid, caprolactam, and laurolactam.

Preferred aliphatic polyamides include polyamide 6; polyamide 6,6; polyamide 4,6; polyamide 6,10; polyamide 6,12; polyamide 11; polyamide 12; polyamide 9,10; polyamide 9,12; polyamide 9,13; polyamide 9,14; polyamide 9,15; polyamide 6,16; polyamide 9,36; polyamide 10,10; polyamide 10,12; polyamide 10,13; polyamide 10,14; polyamide 12,10; polyamide 12,12; polyamide 12,13; polyamide 12,14; polyamide 6,14; polyamide 6,13; polyamide 6,15; polyamide 6,16; and polyamide 6,13.

The inherent viscosity ("IV") of the polyamide component (a) is lower than 0.85 dl/g, preferably in the range of 0.5 to 0.75 dl/g, and more preferably in the range of 0.6 to 0.7 dl/g to achieve a balance among high melt flow for the semi-aromatic polyamide resin for the molding process in SMT application, blistering resistance at SMT process, and mechanical strength. The polyamide component (a) may have an inherent viscosity as described above before initiating the melt blending process with other ingredients, or the IV may be achieved from the polyamide component having an initial IV of greater than 0.9 followed by melt blending with an aromatic organic carboxylic acid and with or without other ingredients. The IV was measured according to ISO standard 307 (or in m-cresol using ASTM 2857) and is reported in units of dl/g.

The aromatic organic carboxylic acid used in the aforementioned preparation has a melting point that is no lower than about 10° C. less than the onset temperature of the melting point endotherm of the polyamide, which may be one or more aromatic group containing monocarboxylic acids, dicarboxylic acids, tricarboxylic acids, higher acids, or aminoacids.

The melting point of the aromatic organic acid will more preferably be no lower than the onset temperature of the melting point endotherm of the semi-aromatic polyamide. As used herein in reference to the organic aromatic carboxylic acid, the term "melting point" refers to sublimation point or decomposition point if the aromatic organic acid does not have a melting point.

By "onset temperature of the melting point endotherm" of the polyamide is meant the extrapolated onset temperature of the melting curve of the polyamide (Tf) as measured by differential scanning calorimetry (DSC) following ASTM method D3418-82 (Reapproved 1988). If the polyamide has two or more melting point endotherms, the onset temperature of the lowest melting point endotherm is selected. If two or more polyamides are used, the onset temperature of the melting point endotherm of the polyamide with the lowest melting point endotherm onset temperature is chosen.

The organic acid is preferably selected from isophthalic acid, terephthalic acid and naphthalene ring containing carboxylic acids. 2,6-naphthalenedicarboxylic acid is most preferred as a selection.

The aromatic organic acid can be used at about 0.1 to about 5 weight percent, preferably at about 0.5 to about 3 weight percent, or more preferably at about 0.7 to about 2 weight percent in the melt blending process to reduce the inherent viscosity of the polyamide component (a') below 0.85 dl/g, preferably in the range of 0.5 to 0.75 dl/g, and more preferably in the range of 0.6 to 0.7 dl/g, where the weight percentages are based on the total weight of polyamide.

Flame Retardant

The at least one flame retardant (b) in the polyamide resin composition in this invention is selected from or are flame retardant combinations (such as disclosed in U.S. Pat. No. 6,255,371) comprising at least one phosphinate of the formula (I), at least one diphosphinate of the formula (II), and/or at least one polymer of phosphinate of the formula (I) and/or disphosphinate of the formula (II),

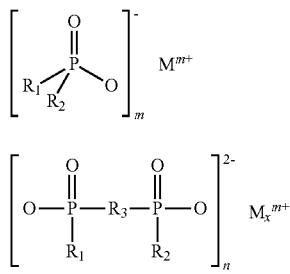

wherein $R_1$ and $R_2$ are identical or different and are $C_1$-$C_6$ alkyl, linear, or branched, and/or aryl; $R_3$ is $C_1$-$C_{10}$-alkylene, linear, or branched, $C_6$-$C_{10}$-arylene, -alkylarylene or -arylalkylene; M is calcium ions, magnesium ions, aluminum ions and/or zinc ions; m is 2 to 3; n is 1 or 3; and x is 1 or 2; and optionally comprising, condensation products of melamine and/or reaction products of melamine with phosphoric acid and/or reaction products of condensation products of melamine with phosphoric acid and/or comprising a mixture of these.

$R_1$ and $R_2$ may be identical or different and are preferably methyl, ethyl, n-propyl, isopropyl, n-butyl, tert-butyl, n-pentyl and/or phenyl. $R_3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. M is preferably aluminum ions or zinc ions.

These compounds are disclosed in U.S. Pat. No. 6,255,371, which is hereby incorporated by reference herein.

Preferred phosphinates are aluminum methylethylphosphinate, and, more preferably, aluminum diethylphosphinate.

The flame retardant (b) is present in the composition in an amount that is about 10 to about 45 weight percent of the amount of polyamide component (a). (For instance, if the composition comprises 40 weight percent of polyamide component (a), it comprises about 4 to about 18 weight percent flame retardant.)

Preferably, the polyamide composition of the present invention may optionally further comprise a variety of zinc borate compounds as flame retardant synergists because they result in superior physical properties, such as the beneficial flow properties of the polyamide composition. By the term "zinc borate" is meant one or more compounds having the formula:

$(ZnO)_X(B_2O_3)_Y(H_2O)_Z$ wherein X is preferably between 2 and 4, inclusive; Y is preferably between 1 and 3, inclusive; and Z is preferably between 0 and 5, inclusive. Zinc borate is sold by US Borax under the tradename Firebrake®. Preferred forms of zinc borate are those in which X=4, Y=1, and Z=1 (Firebrake® 415); in which X=2, Y=3, and Z=3.5 (Firebrake® 290); and in which X=2, Y=3, and Z=0 (Firebrake® 500).

The zinc borate is present in an amount of about 1 to about 5, or preferably about 1 to about 4, or more preferably about 1.2 to about 3.7, or yet more preferably about 1.4 about 3.6 percent of the weight of the flame retardant (b). For the purposes of determining the amount of zinc borate present, if the zinc borate is a hydrate (i.e., Z is not zero), the weight of the corresponding anhydrous form of the zinc borate is used, thus only the amounts of ZnO and $B_2O_3$ present in the zinc borate compound are considered to contribute to the zinc borate weight that is used in the calculation. As used herein in conjunction with the amount of zinc borate used in a composition, the term "zinc borate" refers to anhydrous form of the compound in question.

The composition may optionally further comprise one or more additional flame retardant synergists. Examples include silicone, metal oxides such as silica, boehmite, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide, metal powder such as aluminum, iron, titanium, manganese, zinc, molybdenum, cobalt, bismuth, chromium, tin, antimony, nickel, copper and tungsten, and metal salts such as barium metaborate, zinc carbonate, magnesium carbonate, calcium carbonate, and barium carbonate. Preferred synergists are boehmite (aluminum hydroxide oxide (AlO(OH))) and/or aluminum oxide. When used, the one or more synergists are present in about 10 to about 20 weight percent, based on the total weight of synergist and flame retardant.

Talc

Particularly advantageously, the polyamide composition in the present invention comprises talc (c), which is magnesium silicate and which serves to enhance melt flow in combination with the aromatic acid contained in the polyamide composition. The amount of talc used is about 1 to 15 weight percent, preferably about 2 to 10 weight percent, more preferably about 5 to 10 weight percent, wherein the weight percentages of the talc (c) is based on the total weight of the polyamide (a) or polyamide (a'). The talc (c) may be pretreated with a coupling agent.

The coupling agents useful in this invention may be any of the generally known coupling agents. Among the coupling agents which may be employed herein are the organosilanes, organotitanates such as isopropyl tri(diisooctylphosphato)titanate, isopropyl tri(dioctylphosphto)titanate and the like, resoles which are the condensation polymerization reaction products formed from an excess of formaldehyde and any of phenol, resorcinol or mixtures thereof (see U.S. Pat. No. 3,899,462 to Newbould et al. issued 1975), etc. Silane coupling agents are preferred and suitable compounds are disclosed, for example, in U.S. Pat. No. 3,419,517. Of the silanes, aminosilanes, such as gamma aminopropyltriethoxysilane and N-beta(N-vinylbenzylaminoethyl)-gamma aminopropyltrimethoxy silane hydrochloride; epoxysilanes and vinyl silanes are preferred. The purpose of the coupling agent is to effectively bond the talc (c) to the polyamide component (a). The coupling agent is preferably present in an amount of about 0.1 to 4 weight percent, more preferably about 0.25 to 2 weight percent, based on the weight of the talc (c). Preferably, the silane or other coupling agent is coated directly on the talc (c) prior to the inclusion of the talc (c) into the polyamide component (a) or (a'). Alternatively, the coupling agent may be coated on the polyamide component or added to the polyamide component (a) or (a') when the talc (c) is added in the melt blending process.

The talc (c) used in the present invention is not limited to any specific form of talc. Either particulate or platy form of talc can be used. The talc (c) with median average, $D_{50}$, particle size of less than 100 microns is preferably used in the present invention.

Inorganic Reinforcing Agent and/or Filler

Additional reinforcing agents are added to the polyamide composition of the present invention to achieve the desired physical properties. The inorganic reinforcing agents and/or fillers other than talc (d) are used at about 20 to about 60 weight percent, preferably about 25 to about 55 weight percent based on the total weight of the composition. Examples of inorganic reinforcing agents and/or fillers include one or more of glass fibers, glass flakes, mica, kaolin, clay, wollastonite, calcium carbonate, silica, carbon fibers, potassium titanate, etc. Glass fibers and glass flakes are preferred.

The composition may optionally comprise additional additives such as other polymers, impact modifiers, ultraviolet light stabilizers, heat stabilizers, antioxidants, processing aids, lubricants, and/or colorants (including dyes, pigments, carbon black, and the like).

The compositions are made by melt-blending the components using any known methods. The component materials may be mixed to uniformity using a melt-mixer such as a single or twin-screw extruder, blender, kneader, Banbury mixer, etc. to give a resin composition. Alternatively, a portion of the materials may be mixed in a melt-mixer, and the rest of the materials may then be added and further melt-mixed until uniform.

The compositions of the invention may be formed into articles using any known melt-processing means such as injection molding, blow molding, extrusion, or thermoforming.

Examples of articles that may be formed from the compositions of the present invention are electrical and electronic system component, including housings, electrical connectors and connector housings and cases, breaker housings, and contactor housings. The articles are useful in SMT applications among others.

EXAMPLES

Examples 1-2 and Comparative Examples 1-2

The compositions of Examples 1-2 and Comparative Examples 1-2 were prepared by melt-blending the components shown in Table 1 in a twin-screw extruder. After exiting the extruder, the blended compositions were cooled and cut into pellets. The pellets were surface coated with 0.1 weight percent of calcium montanate.

The compounded product was molded in typical laboratory size molding machines into standard {fraction (1/32)}" ASTM flex bars and standard 4 mm thickness ISO bars. Each sample was rated V-0 according to the UL-94 flammability test on 1/32" thick bars. The 1/32" flex bars were also tested for SMT performance. More specifically, the temperature at which voids are formed in the bar and deformation occurs is known as the "blistering temperature". (The blistering is typically caused by a volatile (like water) which vaporizes during SMT heating and causes "blisters" in the part.) The SMT testing was done by conditioning the bars at 40 C. for 96 hours at 95% relative humidity. The moisture was then confirmed to be in the range of 2-3% moisture to simulate the conditions that the products are exposed to during storage. These conditioned bars were then passed through a SOLSYS-310IR Surface Mount Reflow System. The peak temperature of the part (measured by a thermocouple on the part) without "blistering" was recorded as the maximum SMT temperature. Because the temperature readings for this test were taken in 5 C. increments, the testing was conducted on these bars until the "blistering temperature" (as described above) was reached, and the peak temperature without blistering was recorded as the previous temperature increment. The results of the peak temperature are shown in Table 1.

The inherent viscosities of polyamide component in the melt blended compositions were measured according to ISO/PIS 307, and the results are shown in Table 1.

The melt viscosities of the resulting compositions were determined at 325° C. and 1000 so using a Kayeness rheometer and the results are shown in Table 1.

The following ingredients are used in Table 1:

TABLE 1

|  | Comp. Ex. 1 | Comp. Ex. 2 | Ex. 1 | Ex. 2 |
|---|---|---|---|---|
| Polyamide 6,T/6,6 (a') | 47.7 | 47.4 | 46.4 | 46.0 |
| 2,6-NDA |  |  |  | 0.8 |
| TPA | 0.1 | 0.4 | 0.4 |  |
| Flame retardant (b) | 10.3 | 10.3 | 10.3 | 10.3 |
| Talc (c) |  |  | 1.0 | 1.0 |
| Boehmite | 1.7 | 1.7 | 1.7 | 1.7 |
| Zinc borate | 0.2 | 0.2 | 0.2 | 0.2 |
| Std-glass fibers (d-1) | 20.0 | 20.0 | 20.0 | 20.0 |
| Flat-glass fiber (d-2) | 20.0 | 20.0 | 20.0 | 20.0 |
| Inherent Viscosity of polyamide component (a) (dl/g) | 0.75 | 0.69 | 0.67 | 0.64 |
| Peak temperature (° C.) | 245 | 230 | 240 | 250 |
| Melt Viscosity (Pa · s) | 108 | 86 | 92 | 65 |

Polyamide 6,T/6,6 refers to HTN 502HF having a melting point of about 312° C. and an inherent viscosity of 0.90, available from E. I. du Pont de Nemours & Co, Inc.
2,6-NDA refers to 2,6-naphthalenedicarboxylic acid with a molecular weight of 216 g/mol, manufactured by BP Amoco Chemical Company.
TPA refers to terephthalic acid with a molecular weight of 166 g/mol, available from Junsei Chemical Co., Ltd..
Boehmite refers to Celasule BMT-33, available from Kawai Sekkai Kogyo.
Zinc borate refers to Firebrake ® 290, a zinc borate, available from US Borax. The amount of anhydrous zinc borate in Firebrake ® 290 is about 90 percent.
Flame retardant refers to Exolit ® OP 1230, an aluminum diethylphosphinate available from Clariant.
Talc refers to Kosap#10, 1% amino silane coated talc, available from Nippon Talc Co., Ltd..
Std-glass fiber refers to standard shape glass fiber FT756D, available from Owens Corning Japan Ltd.
Flat-glass refers to flat shape glass fiber 3PA-820S, available from Nitto Boseki Co., Ltd..

Ingredient quantities are given in weight percentages based on the total weight of the composition.

What is claimed is:

1. A process for the preparation of a flame retardant polyamide resin composition, comprising melt-blending a polyamide component (a'), flame retardant (b), talc (c) and inorganic agent other than talc selected from the group consisting of reinforcing agent and filler (d) with 0.1 to 10 weight percent, based on the total weight of the polyamide (a'), of at least one aromatic organic acid having a naphthalene ring, in order to reduce an inherent viscosity of the polyamide component (a') below 0.85 dl/g.

2. The process for the preparation of the resin composition of claim 1, comprising melt-blending
    (a') about 30 to about 71 weight percent of a polyamide component comprising about 20 to 100 weight percent of at least one semiaromatic polyamide
    (b) at least one flame retardant selected from the group consisting of a phosphinate of the formula (I); a disphosphinate of the formula (II); polymers of (I) and polymers of (II)

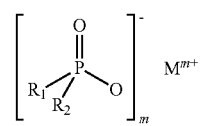

(I)

-continued

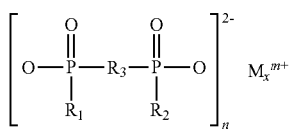

(II)

wherein $R_1$ and $R_2$ are identical or different and are selected from the group consisiting of linear or branched $C_1$-$C_6$ alkyl, and aryl; $R_3$ is selected from the group consisting of linear or branched $C_1$-$C_{10}$-alkylene, $C_6$-$C_{10}$-arylene, $C_6$-$C_{10}$-alkylarylene and $C_6$-$C_{10}$-arylalkylene; M is selected from the group consisting of calcium ion, magnesium ion, aluminum ion and zinc ion; m is 2 to 3; n is 1 or 3; and x is 1 or 2;

(c) about 1 to about 15 weight percent of talc;

(d) about 20 to about 60 weight percent of at least one inorganic agent other than talc selected from the group consisting of reinforcing agent and filler; and (e) about 0.1 to about 5 weight percent of at least one aromatic organic acid having anaphthalene ring, wherein the weight percentages of (a') and (d) are based on the total weight of the composition; wherein flame retardant (b) is present in an amount that is about 10 to about 45 percent of the weight of polyamide (a'); and wherein the weight percentages of (c) and (e) are based on the total weight of the polyamide 3. The process of claim 2, wherein said aromatic organic acid having a naphthalene ring has a melting point that is no lower than about 10° C. less than the onset temperature of the melting point endotherm of the polyamide (a').

4. The process of claim 1, wherein said aromatic organic acid having a naphthalene ring is 2,6-naphthalenedicarboxylic acid.

5. The process of claim 2, wherein said semiaromatic polyamide is selected from one or more of the group consisting of polyamide 9,T;
polyamide 10,T; polyamide 10,T/10,12; polyamide 10,T/1010; polyamide 12,T;
polyamide 6,T16,6; and polyamide 6,T/D,T.

6. The process of claim 1 wherein said reinforcing agent (d) is glass fibers.

7. The process of claim 1 wherein said reinforcing agent (d) is a combination of glass fibers and glass flakes.

8. The process of claim 1 wherein said composition further comprises zinc borate in an amount of from about 1 to about 5 percent of the weight of the flame retardant.

9. The process of claim 1 wherein said composition further comprises boehmite in an amount of from about 10 to about 20 weight percent, based on the total weight of the boehmite and flame retardant (b).

10. An article of manufacture made from compositions according to the process of claim 1.

* * * * *